March 26, 1968     C. T. TROY     3,374,917

INTERLOCKING STRUCTURAL ELEMENTS

Filed Jan. 9, 1964     6 Sheets-Sheet 1

INVENTOR
CONSTANTINE T. TROY

BY *Richard O. Church*

ATTORNEY

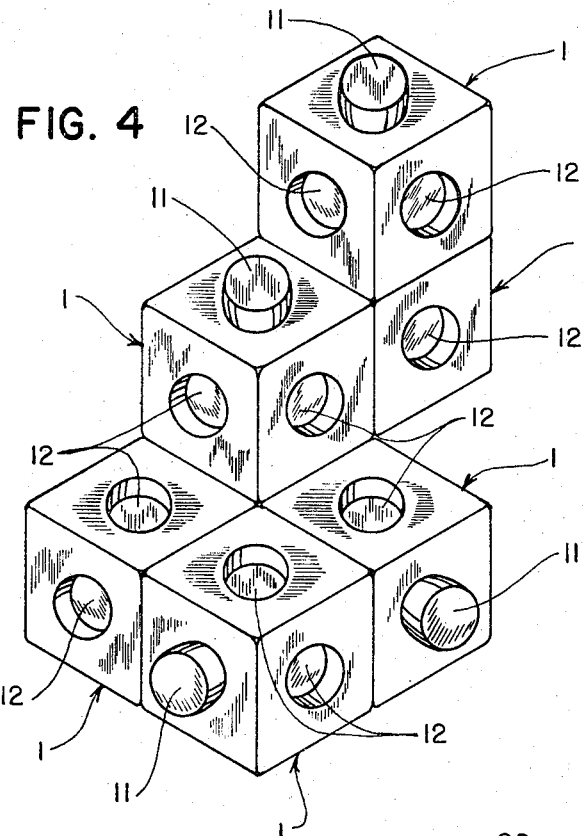
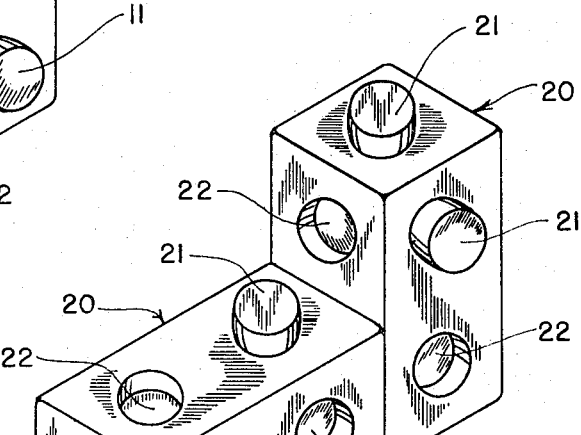
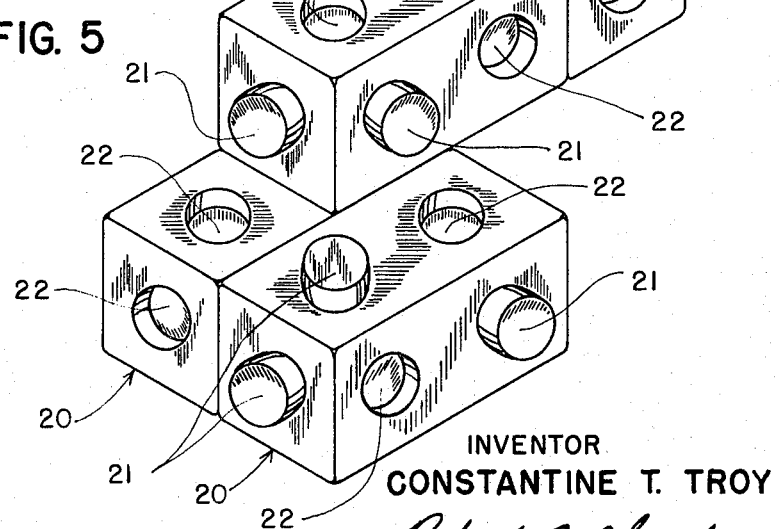

March 26, 1968  C. T. TROY  3,374,917
INTERLOCKING STRUCTURAL ELEMENTS
Filed Jan. 9, 1964  6 Sheets-Sheet 3

INVENTOR
CONSTANTINE T. TROY
BY *Richard O. Church*
ATTORNEY

March 26, 1968 C. T. TROY 3,374,917
INTERLOCKING STRUCTURAL ELEMENTS
Filed Jan. 9, 1964 6 Sheets-Sheet 4

INVENTOR
CONSTANTINE T. TROY

BY *Richard O. Church*
ATTORNEY

March 26, 1968 C. T. TROY 3,374,917
INTERLOCKING STRUCTURAL ELEMENTS
Filed Jan. 9, 1964 6 Sheets-Sheet 5
FIG. 12
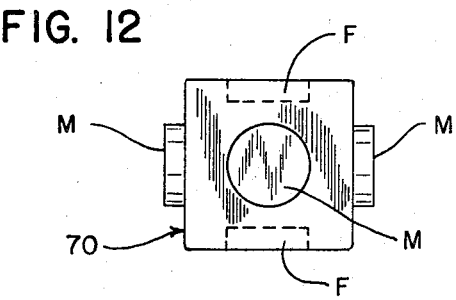
FIG. 10 FIG. 11
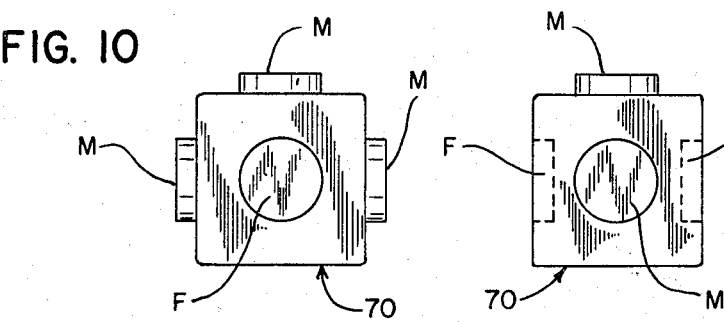
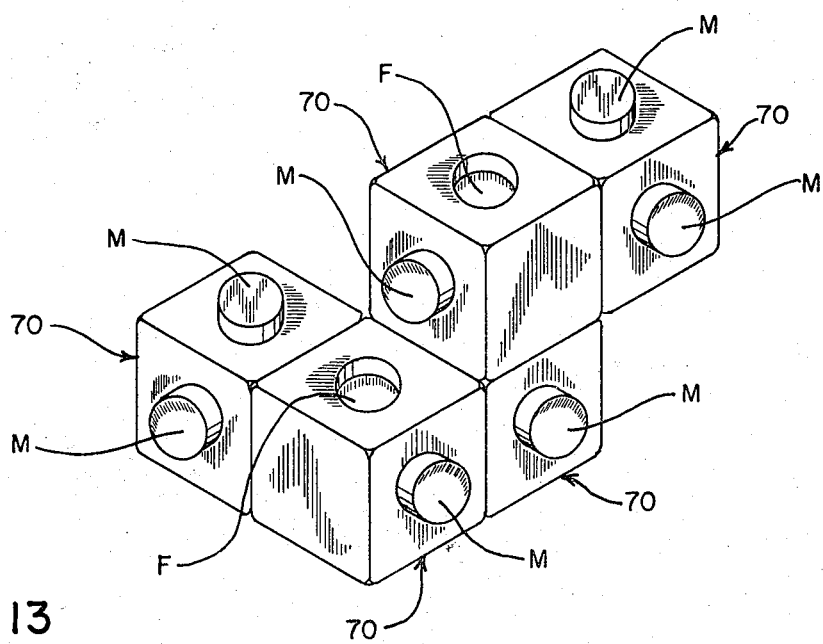
FIG. 13
INVENTOR
CONSTANTINE T. TROY
BY Richard O. Church
ATTORNEY March 26, 1968     C. T. TROY     3,374,917

INTERLOCKING STRUCTURAL ELEMENTS

Filed Jan. 9, 1964     6 Sheets-Sheet 6

INVENTOR
CONSTANTINE T. TROY

BY *Richard P. Church*

ATTORNEY

United States Patent Office 3,374,917
Patented Mar. 26, 1968

3,374,917
INTERLOCKING STRUCTURAL ELEMENTS
Constantine T. Troy, 1330 Cleveland Ave.,
Wyomissing, Pa. 19610
Filed Jan. 9, 1964, Ser. No. 336,670
4 Claims. (Cl. 220—23.4)

This invention relates to structural elements, and, more particularly, to blocks adapted for assembly in removable, interlocking, and mating relationship with each other. The structural elements, or blocks, of this invention are adapted for assembly to form almost endless combinations of modular structures. Depending upon the dimension of these blocks, they may find utility in various diverse ways, such as children's building blocks, for use in making room dividers, shelf arrangements, borders for flower beds, and other aesthetic or functional objects that may be constructed in a modular fashion to lie within a single plane or else a plurality of planes that are either normal or parallel to each other.

In its broadest terms, this invention encompasses blocks that are provided with certain portions of their periphery carrying indentations (female members) and certain other portions carrying projections (male members). The configurations of the male and female members are such that a male member carried by one block may be inserted into mating frictional engagement with a female member carried by another similar block. While the shape and form of the blocks may vary, the spatial relationship of the male and female members is important. In accordance with this invention, the members are held positioned on a block so that planes drawn tangent to the entrance to each of the female portions of a given block and planes drawn tangent to the trailing portions of each of the male members (i.e., the line of intersection between the male members and the face of the block) carried on the same block will all lie on the surfaces of a right-angled parallelepiped. For example, in a simple, but special, form of this invention, a cube is provided having one male or female member on each of its six faces, and the planes tangent to these members, as defined above, will all lie on the surfaces of a right-angled parallelepiped. In the special case, the planes will also circumscribe a cube. Similarly, substantially the same spatial relationship may be maintained by positioning the six male and female members on the surface of a sphere having a diameter equal to the length of the sides of the aforesaid cube. Note that here again the tangent planes all lie on the surfaces of a right-angled parallelepiped and circumscribe a cube.

The blocks described herein may be hollow or solid structures or may be comprised of low density foam. To add visual interest to the blocks, it is often desirable to give them bright colors or combinations of colors. While the material from which these blocks are constructed is not critical to the invention, it is generally preferred to fabricate them from natural and synthetic resinous materials. Of these, the more common and modestly priced plastics such as the polyvinyls, cellulosics, and polyolefins are particularly desirable. These and other similar materials are lightweight, easy to clean and keep clean, and are relatively unbreakable in ordinary usage. Further, their natural resiliency is advantageous as it aids in assembly of the blocks in interlocking relationship with each other, especially when the male and female members are provided with reverse tapers.

Another feature of this invention comprises providing a removable closure device on one face of a hollow block, which closure device may also serve as the male member on that face of the block. By these means, the block may be used as a container for merchandising various househld items such as children's bubble bath soap, cereal, talcum powder, shampoo, detergents, bleaches, dry dog foods, many types of foodstuffs such as nuts, candy, pretzels, potato chips, crackers, and the like.

A further embodiment of this invention provides for a hollow block for merchandising household items wherein the removable closure device is in a fanciful form such as grotesques, likenesses of humans and animals, and the like. Advantageously, in this construction, a raised threaded portion is provided on one face of the block to receive the fanciful closure device, which threaded portion may serve as the male member for that side of the block when the fanciful closure device is removed.

In a further embodiment of this invention, the block, rather than being cubical or spherical, may be rectangular or cylindrical in shape, and provided with more than one male and/or female members along a given face or surface. These shapes may be useful to enable providing containers of various sizes, and also to provide for the construction of different shaped structures when used alone or in combination with cubical or spherical blocks.

The hollow building blocks of this invention may easily be manufactured from resinous materials by any of a number of processes known in the molding art, such as blow molding and rotational casting. As such techniques are so well known, they are not discussed herein.

Accordingly, it is an object of this invention to provide blocks that may be assembled in removable interlocking relationship with each other.

Another object of this invention is to provide interlocking blocks that may be joined at selected faces or surfaces of the blocks to form modular structures lying in a single plane or in a plurality of planes that are normal or parallel to each other.

A further object of this invention is to provide containers and dispensers for various household items that will have continuing utility as children's building blocks, elements for erecting modular structures, and the like, after the contents have been exhausted.

Yet another object of this invention is to provide containers and dispensers for various household items that may be stacked for display purposes in removable, interlocking, and mating relationship to each other.

These and other objects of this invention will become apparent from the following description of the drawings.

In the drawings:

FIG. 4 is an isometric view of a group of blocks of the kind shown in FIG. 1 assembled together in interlocking relationship.

FIG. 5 is an isometric view of a group of blocks having rectangular sides joined together in interlocking relationship.

FIGS. 10, 11 and 12 are front and side elevations and a plan view respectively of a cubical block carrying three male members and two female members.

FIG. 13 is an isometric view of a group of blocks of the kind shown in FIGS. 10, 11 and 12 assembled together in interlocking relationship.

Figure 1:
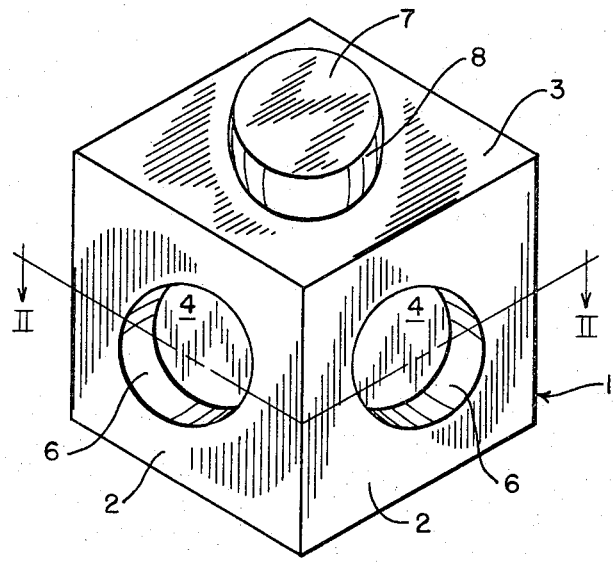
FIG. 1 is an isometric view of a block made in accordance with this invention.
Figure 2:
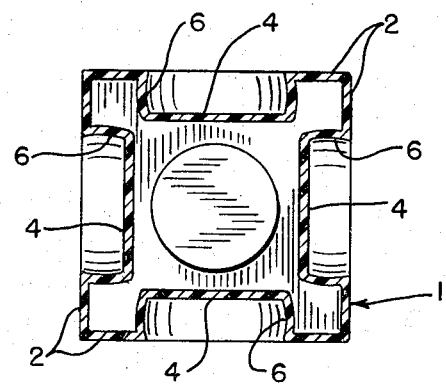
FIG. 2 is a sectional view in plan taken through a plane defined by lines 2—2 of FIG. 1.
Figure 3:
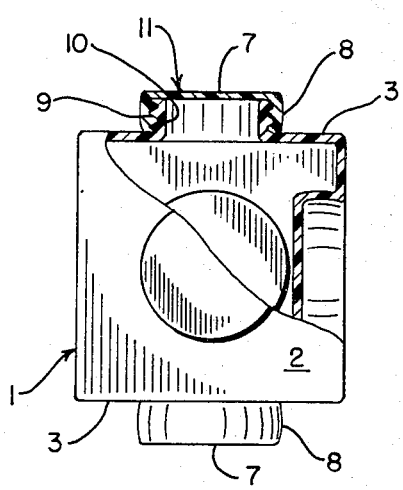
FIG. 3 is a view in side elevation, partially broken away, of the block shown in FIG. 1.

FIGS. 1, 2 and 3 illustrate one of the preferred embodiments of this invention. For descriptive purposes, the block 1 is shown as being a hollow receptacle with a removable closure device that is adapted for packaging various consumable household items. However, it is to be understood that the block 1 may also be solid or filled with foam.

In general, the block 1 comprises a cube with four side faces 2 and two end faces 3. The side faces 2 each carry an indented female member defined by an inner surface 4 and side walls 6. The upper and lower end faces 3 of the block 1 carry a raised male member defined by an outer leading surface 7 and side walls 8.

As shown in more detail in FIG. 3, one of the male members may comprise a removable closure device 11 to provide access to the interior of the block. As herein illustrated, side member 8 of closure device 11 is internally grooved to receive screw threads 9 of a raised portion 10 of top face 3. By these means, the closure device 11 conveniently may alternately be removed from, or engaged into, sealing relationship with block 1.

As shown in FIGS. 1, 2 and 3, the male members are given a slight convex radius adapted to conform to a similar convex radius on the side portion 6 of the female members. While this is not essential to this invention, it is sometimes convenient to provide such mating radii, or, in the alternative, a reverse taper, in order that the male members may securely be held by the female members of the blocks.

FIG. 4 shows a plurality of blocks of the type shown in FIG. 1 assembled in a fanciful manner, illustrating how the blocks may be joined together in interlocking relationship. It should particularly be noted that the blocks may be joined at any or all of their faces, thus allowing freedom to assemble the blocks in any of several desired planes or combinations thereof.

In FIG. 5, another series of blocks is shown assembled in a fanciful and arbitrary manner. These blocks 20 primarily differ from those shown in FIG. 1 in that their side faces are elongated rectangles and carry a plurality of male 21 and female 22 members. The end faces of the blocks 20 carry a male member 21 at one end and a female member 22 on the other end. Each of the side faces carries one male member 21 and one female member 22, and the position of the male and female members is interchanged from one side face to the adjacent face. While this positioning of the male and female members along the side and end faces of the blocks 20 is not essential, it is a preferred construction as it permits the greatest freedom in assembling the blocks in any desired manner.

Figure 6:
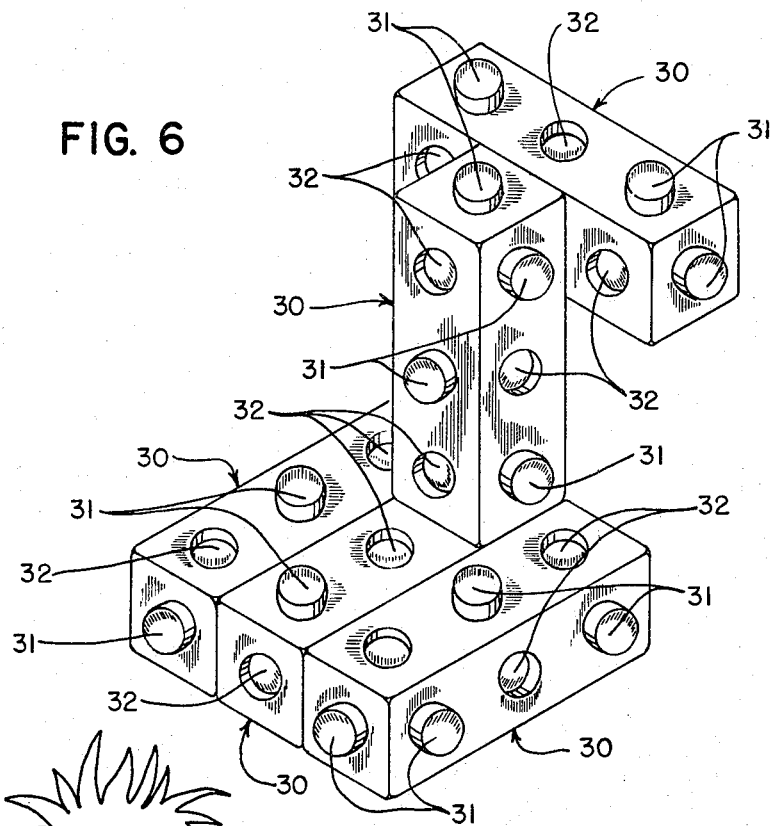
FIG. 6 is an isometric view of a group of still different blocks joined together in interlocking relationship.

The concept as shown in FIG. 5 is carried one step further in FIG. 6 wherein the rectangular blocks 30 contain elongated side faces, each provided with at least three male 31 or female 32 members. Also, as shown in FIG. 5, the end faces carry a single male or female member which may, if desired, vary alternately from one end to the other. The side faces contain male and female members in alternating relationship along a given face as well as between the several adjacent side faces. It can be appreciated that other arrangements of alternate male and female members may be used.

The construction of the blocks variously shown in FIGS. 4, 5 and 6 may be used advantageously to provide various sized containers, the blocks of FIG. 4 being the smallest volumetrically, and the blocks of FIG. 6 the largest. Further, if the male and female members are similar on all sizes of these blocks, the various sized blocks may be assembled together, allowing for even greater variations in design.

Figure 7:
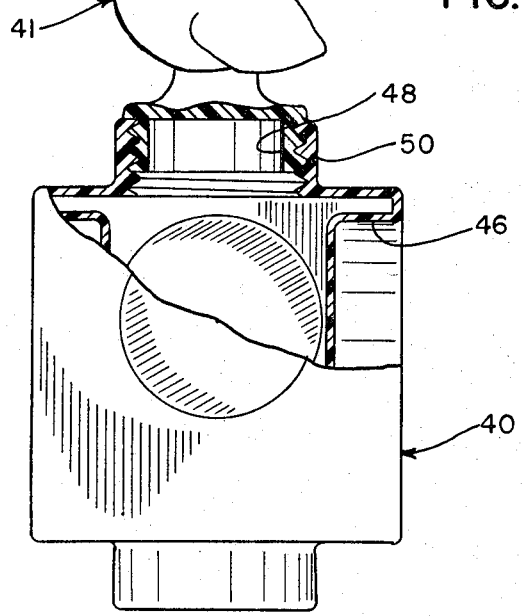
FIG. 7 is a front elevation, partially broken away, showing another feature of this invention.
Figure 8:
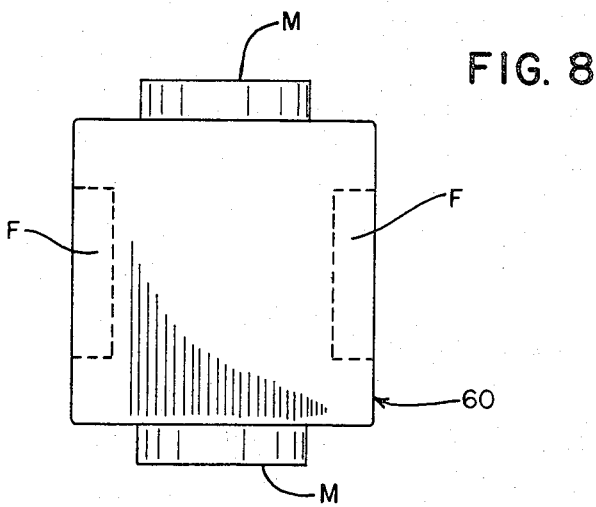
FIG. 8 is a front elevation of a cubical block carrying two male members and two female members.
Figure 9:
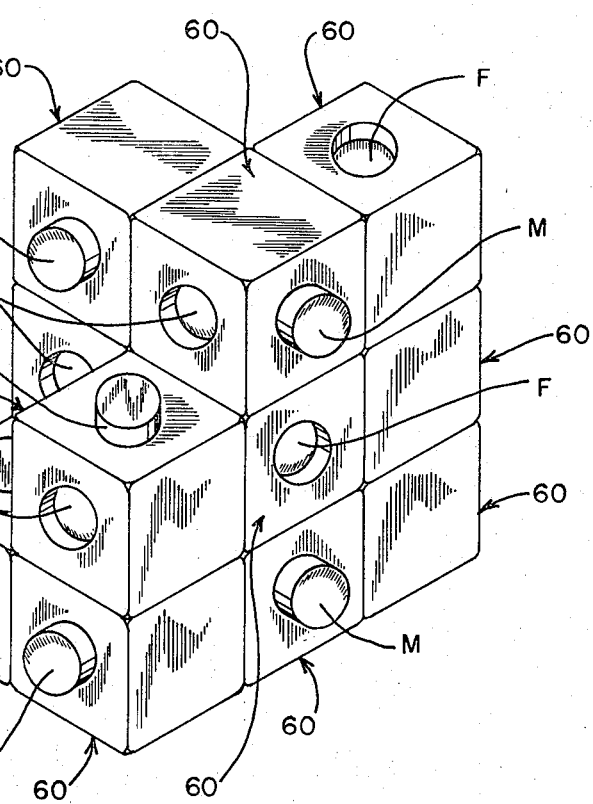
FIG. 9 is an isometric view of a group of blocks of the kind shown in FIG. 8 assembled together in interlocking relationship.

FIG. 7 shows a modification of this invention in which a hollow cube is provided with a fanciful closure device 41. Essentially, the block 40 is similar to the block of FIG. 1 except that the removable closure device 41 carries an ornamental figure. For convenience, the closure device 41 is provided with externally threaded side walls 48 adapted to engage the internal threads carried by upright portion 50 of the top face of the block. When the contents of the container have been exhausted, the fanciful closure device 41 may be set aside as the upright portion 50 of the top face of the block is designed to serve as the male member on that face of the block.

Also, the block 40 in FIG. 7 is shown with straight side walls 46 and 50 to the male and female members. This is merely by way of illustration to show that it is not essential to provide back tapers or radii on these walls.

FIGS. 1 through 7 are all similar in that they illustrate various blocks in which all of the faces of the blocks carry at least one male or one female member. In FIGS. 8 through 17, however, blocks are shown in which one or more of the faces are plain and do not carry either a male or female member. For example, with reference to FIG. 8, there is shown a block 60 carrying male M and female F members on only four sides of the block. Even though a block of this sort has but a total of four members, a series of them may be joined together in a multitude of planes as illustrated by way of example in FIG. 9.

FIGS. 10, 11 and 12 show the side, end and top views respectively of a cubical block 70 carrying three male members M and two female members F. Great latitude is given to joining these blocks together in interlocking relationship in a plurality of planes, and the assembly shown in FIG. 13 is illustrative.

Figure 16:
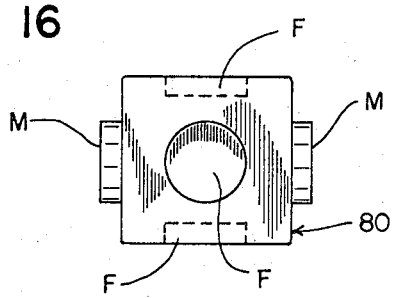
FIGS. 14, 15 and 16 are front and side elevations and a plan view respectively of a cubical block carrying three female members and two male members.
Figures 14, 15:
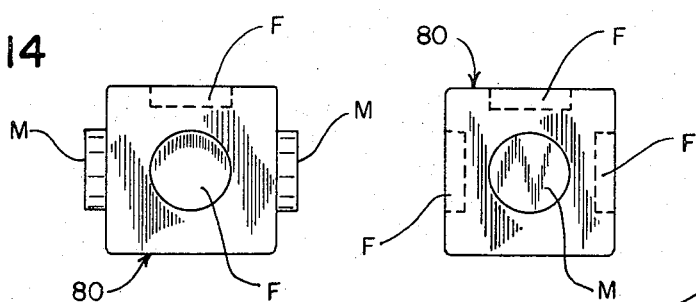

FIGS. 14, 15 and 16 show the side, end and top views respectively of a cubical block 80 comprised of three female members F and two male members M. This type of block is shown assembled with other like ones in FIG. 17.

While the blocks shown in FIGS. 8 through 17 are all illustrative as being cubical in shape, the positioning of the male and female members shown is equally applicable to other geometric structures, such as cylinders in which the diameter is equal to the height, and to spheres. Further, this principle of omitting certain male or female members has validity with elongated structures such as illustrated in FIGS. 5 and 6. No attempt has been made to detail such modifications, however, as the possible permutations become endless, and it is within the skill of a knowledgeable person to design such modifications having the disclosures of this invention placed before him. Accordingly, it is to be understood that such modifications are intended to fall within the concept of this invention.

Figure 18:
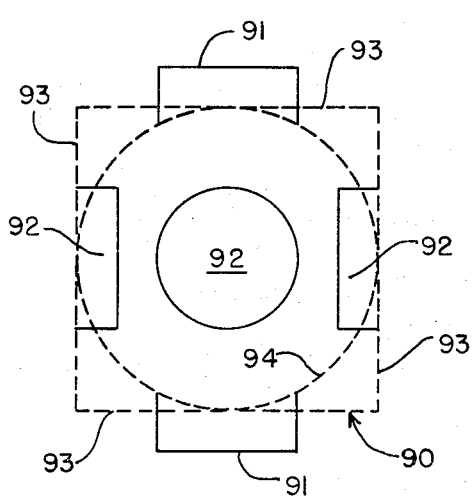
FIG. 18 is a phantom view in elevation showing the spatial relationship between male and female members of a block that may be either cubical, cylindrical or spherical.
Figure 17:
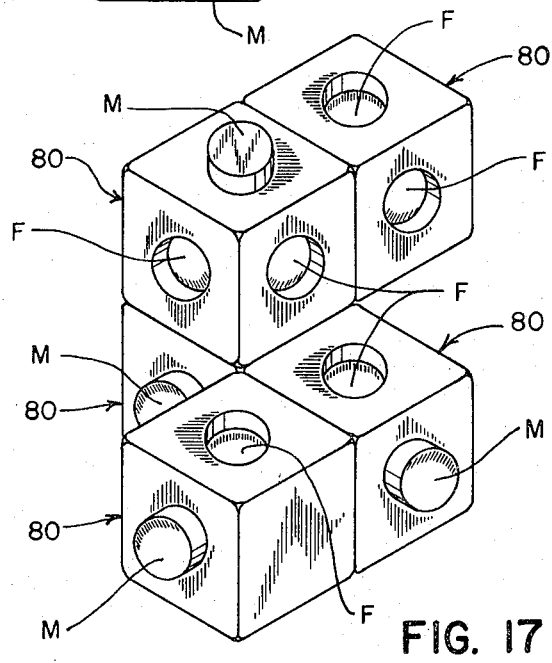
FIG. 17 is an isometric view of a group of blocks of the kind shown in FIGS. 14, 15 and 16 assembled together in interlocking relationship.

FIG. 18 is a phantom view of a block 90 that is similar to the kind illustrated in FIGS. 1 through 3 wherein a total of six male and female members are positioned on each of the six faces of a cube. In this view, three female members 92 are visible, and are represented by solid lines, as are the top and bottom male members 91. The geometric shape that maintains members 91 and 92 in the desired spatial relationship with each other is indicated by the broken lines, wherein lines 93 represent a cube or a cylinder whose height equals its diameter, and curved lines 94 represents a sphere. This serves to illustrate that it is not essential to this invention for the shape of the block to conform to any particular geometric form as long as the spatial relaionship between the various male and female members is properly maintained. It is necessary, however, that planes drawn through points tangent to the outermost portion of the female members and tangent to the trailing edges of the male members will lie upon the surface of a right-angled parallelepiped. Further, in those instances where at least one male or female member is present on each face of a rectilinear structure, a right-angled parallelepiped will be circumscribed by the planes.

While the invention has ben described above with respect to blocks carrying a maximum of three male and female members along a given side or face, it is to be understood that the length of the side faces as compared to the length of the end faces may be any whole multiple thereof, and carry a corresponding number of male or female members. Also, for ease in illustration, the male and female members have been shown as being generally round in cross section, although any other appropriate cross section such as octagonal, square, or the like, will serve with equal effectiveness.

I claim:

1. A closed hollow container adapted to store and dispense various materials comprising:
    a cube bearing a male member on both of its end faces and a female member on each of its four side faces;
    the male and female members being adapted to register in locking frictional engagement with each other and being spaced on the periphery of the cube in a manner such that planes drawn tangent to the entrance of each of the female members and tangent to the trailing portions of each of the male members will lie on the surfaces of the cube;
    whereby the container may be secured in mating relationship with another similar container in any of the three planes parallel to the principal axes of the container.

2. A closed hollow container adapted to store and dispense various materials comprising:
    a cube bearing a female member on both of its end faces and a male member on each of its four side faces;
    the male and female members being adapted to register in locking frictional engagement with each other and being spaced on the periphery of the cube in a manner such that planes drawn tangent to the entrance of each of the female members and tangent to the trailing portions of each of the male members will lie on the surfaces of the cube;
    whereby the container may be secured in mating relationship with another similar container in any of the three planes parallel to the principal axes of the containers.

3. A container according to claim 1 wherein one of the male members is a removable closure device.

4. A closed hollow container adapted to store and dispense various materials comprising:
    a right-angled parallelepiped in which the lengths of the side faces are whole multiples of the width of the end faces;
    one of the end faces bearing a male member and the other of the end faces bearing a female member;
    each side face bearing at least one male and one female member, the total number of members on any one side face being equal to the number of the even multiple;
    the male and female members being arranged to alternate on any given face and to alternate around the narrow perimeter of the container;
    whereby the container may be secured in mating relationship with another similar container in any of the three planes parallel to the principal axes of the container.

References Cited

UNITED STATES PATENTS

| 1,330,780 | 2/1920 | Bonte. | |
| 1,637,667 | 8/1927 | Vaughan | 46—11 |
| 1,895,611 | 1/1933 | Doak | 46—26 |
| 2,631,747 | 3/1953 | Stolte | 46—25 |
| 2,800,743 | 7/1957 | Meehan | 46—25 |
| 2,810,233 | 10/1957 | Jakobsen | 46—28 |
| 2,975,930 | 3/1961 | Pennington | 220—23.4 |
| 3,192,738 | 7/1965 | Charles | 46—25 |

FOREIGN PATENTS

| 209,428 | 1957 | Australia. |
| 1,146,360 | 1957 | France. |
| 1,189,730 | 1959 | France. |
| 1,264,926 | 1961 | France. |
| 593,716 | 1947 | Great Britain. |
| 518,217 | 1955 | Italy. |
| 330,424 | 7/1958 | Switzerland. |

THERON E. CONDON, *Primary Examiner.*

JOHN E. MURTAGH, *Examiner.*

G. E. LOWRANCE, *Assistant Examiner.*